(12) United States Patent
Takehara (10) Patent No.: US 7,219,296 B2
(45) Date of Patent: May 15, 2007

(54) INFORMATION REPRODUCING APPARATUS AND METHOD WITH CORRECTION OF EQUALIZED SIGNAL LEVELS

(75) Inventor: Shintaro Takehara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 525 days.

(21) Appl. No.: 10/767,453

(22) Filed: Jan. 30, 2004

(65) Prior Publication Data

US 2004/0250197 A1 Dec. 9, 2004

(30) Foreign Application Priority Data

Jan. 31, 2003 (JP) .............................. 2003-024424

(51) Int. Cl.
*G11B 20/18* (2006.01)
*H03M 13/41* (2006.01)

(52) U.S. Cl. ............... 714/795; 369/47.25; 369/53.35; 714/796

(58) Field of Classification Search ................ 714/709, 714/795, 796; 360/65; 369/47.25, 53.35
See application file for complete search history.

(56) References Cited

U.S. PATENT DOCUMENTS

| | | | | |
|---|---|---|---|---|
| 5,400,189 A * | 3/1995 | Sato et al. | ..................... | 360/65 |
| 5,418,660 A * | 5/1995 | Sato et al. | ..................... | 360/65 |
| 5,583,706 A * | 12/1996 | Dudley et al. | ................. | 360/46 |
| 5,606,464 A * | 2/1997 | Agazzi et al. | ................. | 360/46 |
| 5,719,843 A * | 2/1998 | Nakajima et al. | ......... | 369/59.22 |
| 5,917,794 A * | 6/1999 | Honma | ..................... | 369/59.15 |
| 6,005,729 A * | 12/1999 | Poss | ............................. | 360/51 |
| 6,064,536 A * | 5/2000 | Ebisawa et al. | ............. | 360/65 |
| 6,385,239 B1 * | 5/2000 | Ebisawa et al. | ............. | 372/232 |
| 6,618,338 B1 * | 9/2003 | Fujiwara et al. | ......... | 369/59.22 |
| 6,661,761 B2 * | 12/2003 | Hayami et al. | .......... | 369/59.21 |
| 6,674,707 B2 * | 1/2004 | Ogura et al. | .............. | 369/59.22 |
| 6,678,230 B2 * | 1/2004 | Miyashita et al. | ........ | 369/53.16 |
| 6,747,936 B1 * | 6/2004 | Shim | ....................... | 369/59.22 |

(Continued)

FOREIGN PATENT DOCUMENTS

JP 6-4810 1/1994

(Continued)

OTHER PUBLICATIONS

Japanese Office Action dated Mar. 7, 2006 for Appln. No. 2003-024424.

(Continued)

*Primary Examiner*—Stephen M. Baker
(74) *Attorney, Agent, or Firm*—Pillsbury Winthrop Shaw Pittman, LLP (57) ABSTRACT

An information reproducing apparatus has an equalizing filter which performs partial response equalization of a detection signal detected by a detecting section and which outputs an equalized signal, a variable gain amplifier which corrects the potential of the equalized signal in accordance with a correction amount determined in accordance with a plurality of reference levels that are used for maximum-likelihood decoding and a plurality of peak levels in a histogram of equalized signals corresponding to the plurality of reference levels, and a maximum-likelihood decoder which performs the maximum-likelihood decoding by referencing the reference levels, in accordance with the equalized signal that has been corrected. The apparatus controls the signal amplitude of the equalized signal to an appropriate value, thereby implementing high-reliable decoding processing.

16 Claims, 8 Drawing Sheets

U.S. PATENT DOCUMENTS 6,992,964 B2 * 1/2006 Takehara et al. ......... 369/59.22

FOREIGN PATENT DOCUMENTS

| JP | 9-44998 | 2/1997 |
| JP | 2000-15515 | 1/2000 |
| JP | 2002-312902 | 10/2002 |
| JP | 2002-367287 | 12/2002 |

OTHER PUBLICATIONS

U.S. Appl. No. 10/382,985, filed Mar. 7, 2003, Shintaro Takehara.

Chinese Office Action dated Sep. 8, 2006 for Appln. No. 200410055253.5.

* cited by examiner

INFORMATION REPRODUCING APPARATUS AND METHOD WITH CORRECTION OF EQUALIZED SIGNAL LEVELS

CROSS-REFERENCE TO RELATED APPLICATIONS

This application is based upon and claims the benefit of priority from the prior Japanese Patent Application No. 2003-024424, filed Jan. 31, 2003, the entire contents of which are incorporated herein by reference.

BACKGROUND OF THE INVENTION

1. Field of the Invention

The invention relates generally to an information reproducing apparatus, and more particularly to an information reproducing apparatus and an information reproducing method for performing decoding using PRML (partial response and maximum likelihood) techniques.

2. Description of the Related Art

In recent years, information recording/reproducing apparatuses for performing recording/reproduction with a recording medium, for example, an optical disk such as a DVD (digital versatile disk), have enjoyed widespread public use. This involves growing demands for implementing even higher recording densities by use of various techniques. In response to such demands, for example, PRML techniques are used as information recording/reproducing techniques for recording media such as optical disks.

In a PRML signal communication technique, a reproduction signal corresponding to optical-disk containing information detected by a pickup head is partial-response (PR) equalized by an equalizer or the like, an equalized signal is thereby obtained, the equalized signal is maximum-likelihood decoded, and the optical-disk containing information is thereby reproduced.

A maximum likelihood decoder (ML decoder) calculates an Euclidean distance between the equalized signal and an ideal signal, and decodes the signal into a bitstream that outputs an most likely ideal signal. In PRML signal processing, a bit error rate of a bitstream decoded by the maximum-likelihood decoder much relies on the equalized signal level. As such, control of the equalized signal level, specifically, the signal amplitude, is a problem to be resolved.

As a prior art related to the above, a digital device has been proposed (as disclosed in Jpn. Pat. Appln. KOKAI Publication No. 9-44998). In the proposed digital device, an amplitude control circuit for controlling the amplitude of an equalized signal performs amplitude control in accordance with the difference between a signal of an equalizer and a target signal used to perform maximum-likelihood decoding.

In the prior art, however, in PRML signal processing, errors can occur more easily as the Euclidean distance between correct and error bitstreams is shorter. Generally, such a bitstream includes contiguous bits conforming to a minimum run-length constraint, such as 2T. A deviation may be caused between the reference level and the level of the equalized signal produced by a minimum run-length sequence of, for example, 2T. Thus, according to the prior art, a deviation is caused between the reference level and the peak level of the equalized signal in shortest contiguous bits of, for example, 2T. This increases the probability of causing bit errors in decoding processing by a maximum-likelihood decoder in a rear stage.

BRIEF SUMMARY OF THE INVENTION

According to an aspect of the present invention, there is provided an information reproducing apparatus for performing maximum-likelihood decoding by reading out information recorded on a recording medium, comprising: a detecting section which detects information recorded in the recording medium and which outputs a reproduction signal; an equalizing section which performs partial response equalization of a detection signal detected by the detecting section and which outputs an equalized signal; a correcting section which corrects the potential of the equalized signal output from the equalizing section in accordance with a correction amount determined on the basis of a plurality of reference levels that are used for the maximum-likelihood decoding; and a maximum-likelihood decoding section which performs the maximum-likelihood decoding by referencing the reference levels, in accordance with the equalized signal corrected by the correcting section.

DETAILED DESCRIPTION OF THE INVENTION

Referring to the accompanying drawings, an information reproducing apparatus and an information reproducing method according to the invention will be described in detail hereinbelow with reference to a recording/reproducing optical disk apparatus as an example. While each of the embodiments will thus be described with reference to an optical disk as an objective recording medium, the recording medium is not limited thereto. In accordance with equivalent technical principles, the invention exhibits equivalent effects and advantages even with recording media such as magneto-optical disks.

First Embodiment

A first embodiment of the invention is to provide an information reproducing apparatus and an information reproducing method that reduce decode errors to correct equalized signals produced from an equalizer so as to correspond to reference levels of Viterbi decoding. To achieve this, for example, correction processing is performed so that the amount of expansion of each of equalized signal waveforms at reference levels LV0 and LV6 reaches a difference LVd between individual reference levels of a Viterbi decoder.

(Configuration of Optical Disk Apparatus of the Invention (First Embodiment))

Figure 1:
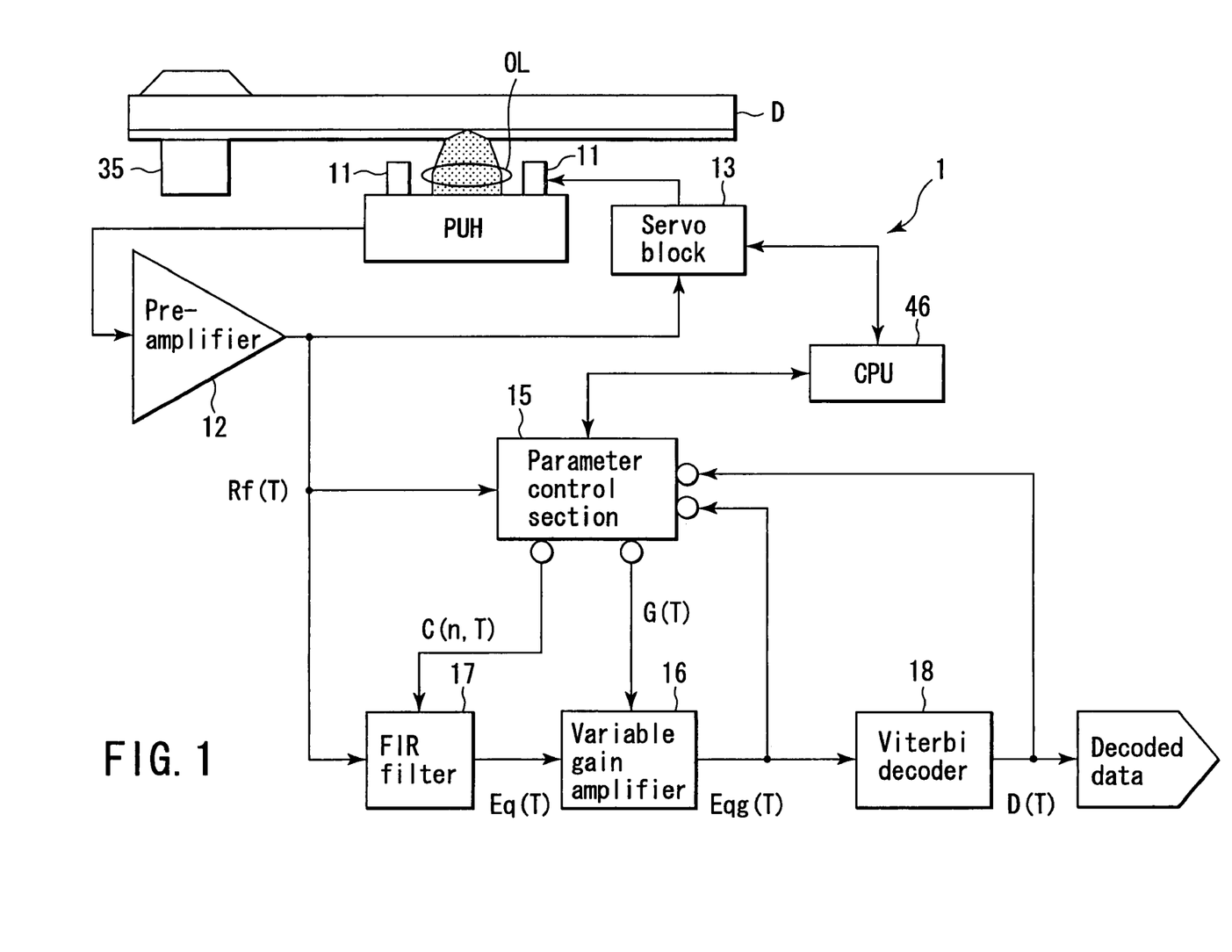
FIG. 1 is a block diagram showing an example of major portions of an optical disk apparatus according to a first embodiment of the invention.

FIG. 1 is a block diagram showing an example of major portions of an optical disk apparatus according to the invention (first embodiment).

Figure 2:
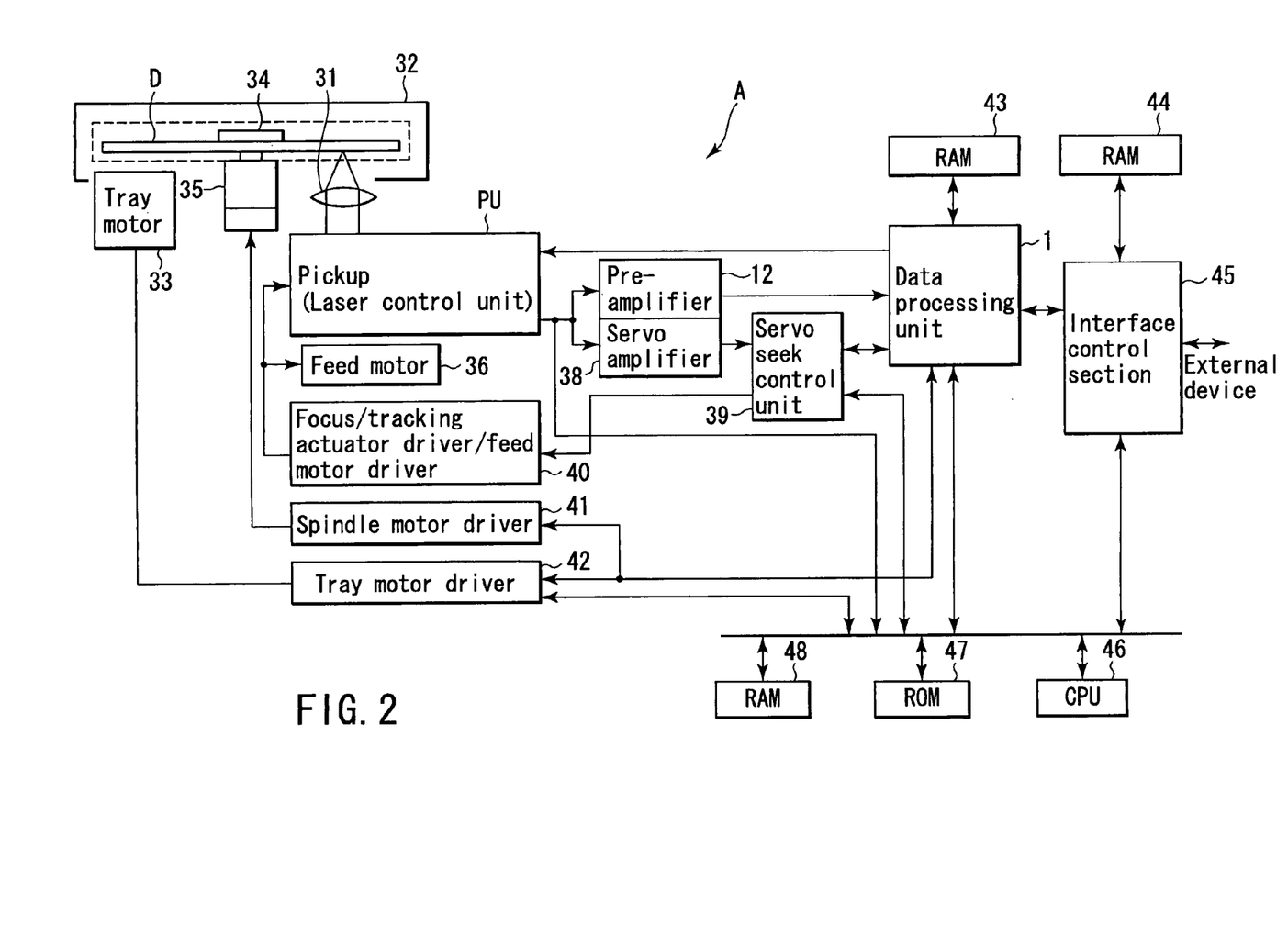
FIG. 2 is a block diagram showing an example of the optical disk apparatus according to the first embodiment.

Referring to FIG. 2, an optical disk apparatus A of the invention (first embodiment) records data on and reproduces data from an optical disk D. The configuration of the optical disk apparatus A has a tray 32 which transports the optical disk D stored in a cartridge, a tray motor 33 which drives the tray 32, a clamper 34 which holds the optical disk D, and a spindle motor 35 which rotationally drives the optical disk D held by the damper 34. The optical disk apparatus A is connected via a control bus to a CPU 46 which performs overall control as a control section; a ROM 47 which stores basic programs and the like for performing control operations; and a RAM 48 which stores control programs, application data, and the like such that they are rewritable. Further provided in the configuration in connection to the control sections such as the CPU 46 are a feed motor 36 which moves a pickup PU; a focus/tracking actuator driver/feed motor driver 40 which performs, for example, focusing of the pickup and tracking control; a spindle motor driver 41 which drives the spindle motor 35; and a tray motor driver 42 which drives the tray motor 33.

The configuration of the optical disk apparatus A further has a preamplifier 12 and a servo amplifier 38 that are coupled to a pickup head PUH to amplify a detection signal; and a servo seek control unit 39 which feeds seek signals used for seek operations to the driver 40. Further provided in the configuration are a data processing unit 1 is coupled to members such as the preamplifier 12 and the servo seek control unit 39 to process detection signals and recording signals; and a RAM 43 which stores data used for the aforementioned processing. An interface control section 45 is provided in association with a RAM 44 to communicate signals from the data processing unit 1 with an external device.

In the optical disk apparatus A according to the invention (first embodiment), the data processing unit 1 is further arranged to include the configuration shown in FIG. 1 to correct a difference between a reference level of maximum-likelihood decoding and a peak level of an equalized signal. Specifically, for example, equalized signals output from an equalizer are amplified at amplification factors to cause peak levels LP2 and LP4 corresponding to peaks in a central portion of the histogram generated by run-lengths of 2T or the like to have potentials substantially matching reference levels LV2 and LV4, respectively. This enables a maximum-likelihood decoder to implement reliable decoding processing without causing an erroneous determination in comparison processing between the equalized signal and the reference level.

(Basic Operations of Optical Disk Apparatus)

The optical disk apparatus thus configured is provided to embody the invention and performs reproduction processing and recording processing with the optical disk in the manner described hereunder. Upon insertion of the optical disk D into the optical disk apparatus A, the pickup head PUH and the data processing unit 1 are used to read out control information of the optical disk D. The control information is recorded in a control data zone in an embossed data zone in a read-in area of the optical disk D. The read out control information is then fed into the CPU 46.

In the optical disk apparatus A of the invention (first embodiment), a laser is energized by a laser control unit (not shown) to generate a laser beam under control of the CPU 46 in accordance with various information. The various information include operation information dependent on user operations, control information of the optical disk D which is recorded in the control data zone of the optical disk D, and current status information, for example.

The generated laser beam is converged by an objective lens 31, and is irradiated in a recordable region of the optical disk D. Thereby, data is recorded into the record region of the optical disk D (generation of a mark string: data is recorded on the optical disk D in accordance with variable a mark-to-mark interval and individual variable mark lengths). Alternatively, light at an intensity corresponding to stored data is reflected and detected, and the detected data are reproduced.

In the configuration shown in FIG. 2, the laser control unit included in the pickup head PUH is set by the data processing unit 1. In this case, the setting contents are different depending on a reproduction power for obtaining a reproduction signal Rf, a record power for recording data, and an erasure power for erasing data. The laser beam is different depending on the three different powers in level, and the laser control unit energizes a semiconductor laser unit to generate a laser beam different in the power level.

The laser control unit is formed to include a resistor (not shown) and a transistor (not shown), in which power supply voltage is applied to the resistor, the transistor, and a semiconductor laser disposed as a semiconductor laser unit. In this configuration, the amplification factor is different depending on the base current of the transistor, different currents flow into a semiconductor laser oscillation unit, and a laser beam different in intensity is thereby generated. In the configuration being discussed, record waveform correction is performed corresponding to characteristics of each optical disk D, the laser power is generated corresponding to a record waveform pulse W output from a record-waveform generating circuit 11, and recording processing into the each optical disk D is thereby implemented.

The optical disk D is carried by the tray 32 into the apparatus directly or after being stored into a disk cartridge such that the optical disk D is disposed opposite to the objective lens 31. The tray motor 33 is provided in the apparatus to drive the tray 32. In addition, the optical disk D is held over the spindle motor 35 to be rotational with the clamper 34. The optical disk D is driven by the spindle motor 35 to rotate at a predetermined rotational speed.

The pickup head PUH includes therein a photodetector (not shown) which detects a laser beam. The photodetector is responsible for detecting a laser beam reflected off the optical disk D and then returned via the objective lens 31. A detection signal (current signal) output from the photodetector is converted by a current/voltage converter (I/V), and a converted signal is then fed into the preamplifier 12 and the servo amplifier 38. The preamplifier 12 then outputs reproducing signals for reproducing header-section data and recordable region data to the data processing unit 1. The servo amplifier 38 outputs servo signals (a track error signal and a focus error signal) to the servo seek control unit 39.

Techniques generally employed for optically detecting defocus amounts include, for example, astigmatic and knife-edge techniques, as described below.

The astigmatic technique is a technique in which an optical device (not shown) for causing astigmatic difference is disposed in a detection light path of laser light reflected off a light reflection layer or light reflective recording layer of the optical disk D, and variations in the shape of the laser light irradiated onto the photodetector is detected. A photodetection region is diagonally divided into four regions. The difference in trace is taken in the servo seek control unit 39 to thereby obtain a focus error detection signal (focus signal) with respect to the individual detection signals obtained from the respective photo-detection regions.

The knife-edge technique is a technique in which a "knife edge" for partly block light asymmetric with respect to laser light reflected off the optical disk D is disposed. A photodetection region is divided into two, and the difference between detection signals individually obtainable from the photo-detection regions is taken to thereby obtain a focus error detection signal.

In general, the astigmatic technique or the knife-edge technique is employed.

The optical disk D has spiral or concentric tracks on which information is recorded. A focal spot is traced along the tracks to perform reproduction or recording/erasure. In this case, to stably trace the focal spot along the tracks, relative positional errors between the tracks and the focal spot need to be optically detected.

In general, as tracking-error detection techniques, for example, a phase-difference detection technique, a push-pull technique, a twin-spot technique, as described hereunder, are employed.

According to the focus control and track control, a focus signal, a tracking signal, and a feed signal are sent from the servo seek control unit 39 to the focus/tracking actuator driver/feed motor driver 40. In response, the focus/tracking actuator driver/feed motor driver 40 implements focus servo control or tracking servo control of the objective lens 31. In addition, corresponding to an access signal an energizing signal is fed from the driver 40 to the feed motor 36, and the pickup head PUH is then movably controlled.

The servo seek control unit 39 is controlled by the data processing unit 1. Specifically, for example, an access signal is fed from the data processing unit 1 to the servo seek control unit 39, and a feed signal is then generated.

Control signals sent from the data processing unit 1 control the spindle motor driver 41 and the tray motor driver 42. Thereby, the spindle motor 35 and the tray motor 33 are activated; specifically, the spindle motor 35 is rotationally driven at a predetermined rotational speed, and the tray is appropriately controlled by the tray motor 33.

A reproduction signal Rf corresponding to header-section data fed to the data processing unit 1 is fed to the CPU 46. In accordance with the received reproduction signal Rf, the CPU 46 determines a sector number as an address of the header section, and then compares the sector number with a sector number as an address that is to be accessed (data is recorded or recorded data is reproduced).

In accordance with a reproduction signal Rf corresponding to recordable region data fed to the data processing unit 1, necessary data is stored into the RAM 48. The reproduction signal Rf is processed in the data processing unit 1 and is fed to the interface control section 45. Then, a reproduction processing signal is fed to an external device, such as a personal computer.

(Viterbi Decoding Processing Involving Optimization of Equalized Signals According to the Invention)

Figure 4:
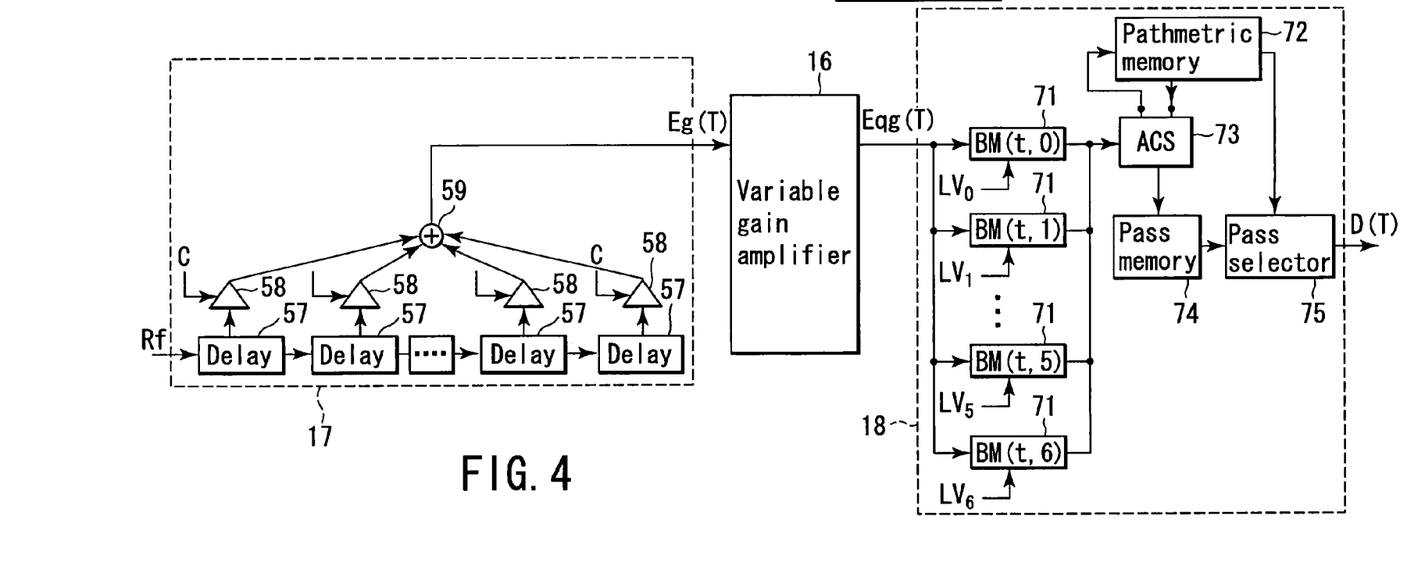
FIG. 4 is a block diagram showing an example of a finite impulse response (or "FIR") filter and a Viterbi decoder of the optical disk apparatus according to the first embodiment.
Figure 5:
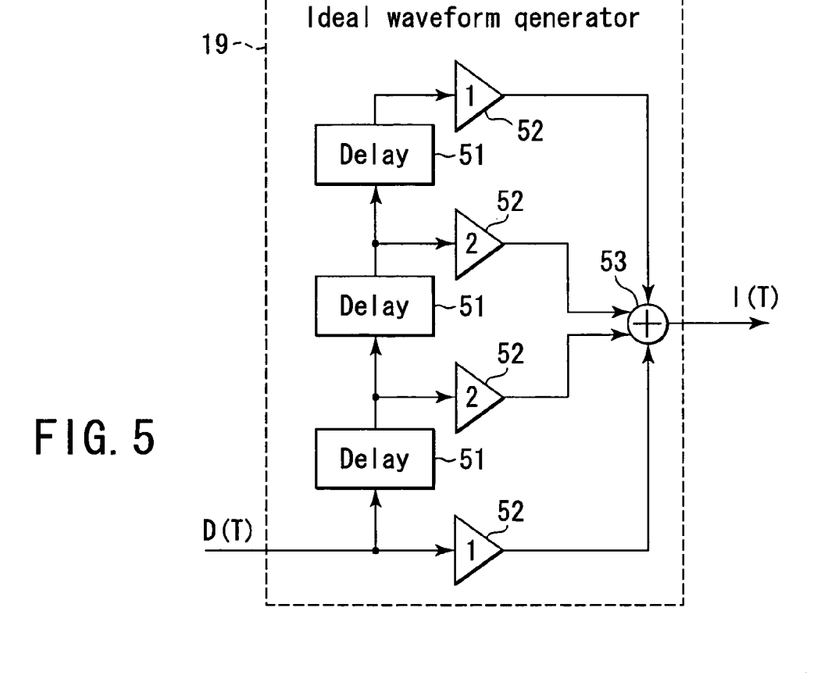
FIG. 5 is a block diagram showing examples of an ideal waveform generator and level detectors of the optical disk apparatus according to the first embodiment.

Optimizing processing for equalized signals, which is a feature of the invention, will be described in detail hereinbelow with reference to the drawings. FIG. 1 is a block diagram showing the optical disk apparatus according to the first embodiment of the invention. FIG. 2 is a block diagram showing an example of a parameter control section 15 of the first embodiment. FIG. 4 is a block diagram showing an example of an FIR filter and a Viterbi decoder of the optical disk apparatus. FIG. 5 is a block diagram showing an example of an ideal waveform generator and level detectors of the optical disk apparatus.

Major portions of the information reproducing apparatus according to the invention in FIG. 1 are portions of the configuration of the data processing unit 1 in FIG. 2 and peripheral configurations thereof. Description of configuration portions common to those in FIG. 2 will be omitted herefrom, and only portions specific to the configuration shown in FIG. 1 will be described hereunder.

The pickup head PUH has an objective lens OL, and is driven by an objective lens actuator 11 upon receipt of a driving signal from a servo block 13. The data processing unit 1 has an FIR (finite impulse response) filter 17, which is a transversal filter for performing equalization processing of detection signals detected through the pickup head PUH; a variable gain amplifier 16 (VGA) for performing optimization processing of an equalized signal, which is a feature of the invention; and a Viterbi decoder 18 coupled to the variable gain amplifier 16 to receive an equalized signal Eq(T) therefrom. The parameter control section 15 receives a post-correction equalized signal Eqg(T) from the variable gain amplifier 16 and a decoded signal D(T) from the Viterbi decoder 18, feeds a tap coefficient C(n,T) to the FIR filter 17, and feeds a gain signal G(T) to the variable gain amplifier 16. As described below in detail, the parameter control section 15 has an ideal waveform generator 19 and a level detector 20 and is operated and controlled by the CPU 46 shown in FIG. 1. The ideal waveform generator 19 receives the decoded signal D(T) from the Viterbi decoder 18, and in turn generates an ideal waveform signal I(T). The level detector 20 receives the ideal waveform signal I(T) from the ideal waveform generator 19, and in turn generates a gate signal T corresponding to timing with which a specific reference level is output.

Figure 3:
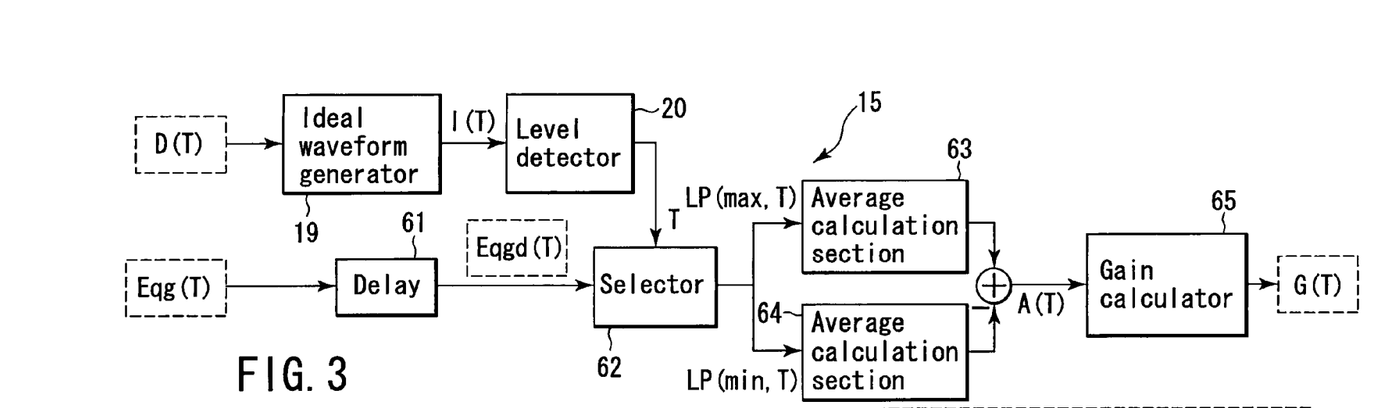
FIG. 3 is a block diagram an example of a parameter control section of the optical disk apparatus according to the first embodiment.

Thus, the parameter control section 15 has the ideal waveform generator 19, which is fed with the decoded signal D(T) from the Viterbi decoder 18, and the level detector 20, which is coupled to the ideal waveform generator 19, as shown in FIG. 3. An output of the level detector 20 is fed to a selector 62. In addition, the post-correction equalized signal Eqg(T) sent from the variable gain amplifier 16 is fed to the selector 62 via a delay circuit 61. Outputs LP(max,T) and LP(min,T) from the selector 62 are fed to average calculation sections 63 and 64, respectively. Outputs of these sections 63 and 64 are fed to an adder, amplitude information A(T) is then output from the adder, and the amplitude information A(T) is then fed to a gain calculator 65. The gain calculator 65 in turn outputs a gain signal G(T), and the gain signal G(T) then fed to the variable gain amplifier 16, as described above. The variable gain amplifier 16 is enabled thereby to perform appropriate amplification processing of the equalized signal, as described below in detail.

In addition, as shown in FIG. 4, the FIR filter 17 receives tap coefficients C(n,T) from delay circuits 57 that correspond in quantity to the number of lines, that receives reproduction signals Rf(T), and that sequentially impart predetermined delays thereto and from the parameter control section 15; appropriately amplitudes the delayed reproduction signals Rf(T) corresponding to the tap coefficients C(n,T); adds the signals at an adder 59; and outputs an equalized signal Eqg(T). An equalized signal Eqg(T) appropriately corrected by the variable gain amplifier 16 having received the equalized signal Eq(T) is further fed to the Viterbi decoder 18.

The Viterbi decoder 18 has branch metric circuits 71 corresponding in quantity to the number of levels. Outputs of these circuits 71 are fed to an ACS (add compare selector) circuit 73, and an output of the ACS circuit 73 is fed to a pathmetric memory 72. An output of the pathmetric memory 72 is fed to a pass selector 75, and an output of the ACS circuit 73 is fed to the pass selector 75 via a pass memory 74. Consequently, a decoded signal D(T) is obtained.

In more specific, in the Viterbi decoder 18, a differential signal of the equalized signal Eqg(T) having been fed is obtained by the branch metric circuits 71 in accordance with reference levels LV0 to LV6. The obtained differential signal is fed to the ACS circuit 73. Then, the decoded signal D(T) of the equalized signal Eqg(T) that has been fed is obtained from the pass selector 75 via the pathmetric memory 72 and the pass memory 74.

The ideal waveform generator 19 and the level detector 20 that are shown in FIG. 3 are shown in detail in FIG. 5. The ideal waveform generator 19 has a plurality of delay circuits 51 that receive the decoded signal D(T) from the Viterbi decoder 18; a plurality of amplifier circuits 52 provided in connection to the delay circuits 51; and an adder 53 that receives outputs of the amplifier circuits 52.

From the ideal waveform signal I(T) from the ideal waveform generator 19, the level detector 20 outputs the gate signal T with the timing with which a desired reference level (LV0 and LV6 in the present embodiment) has been output.

In the configuration as described above, the ideal waveform generator 19 generates the ideal waveform signal I(T) by performing convolutional integrations of the decoded signal D(T) received from the Viterbi decoder 18 and PR (1, 2, 2, 1) characteristics. Then, the ideal waveform signal I(T) is fed to the level detector 20.

In the level detector 20, the gate signal T is output from the ideal waveform signal I(T) with the timing with which the reference levels LV0 and LV6 have been output.

(Optimization of Amplitude of Equalized Signal)

Figure 6:
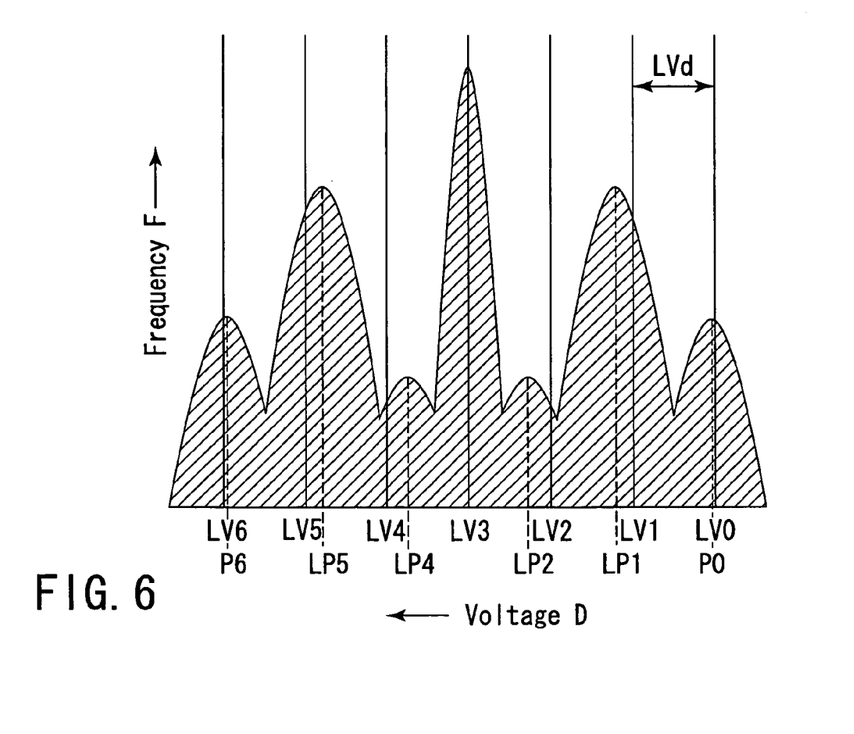
FIG. 6 is an example of a histogram of equalized signals before being corrected by a variable gain amplifier and reference levels of the Viterbi decoder of the optical disk apparatus according to the first embodiment.
Figure 7:
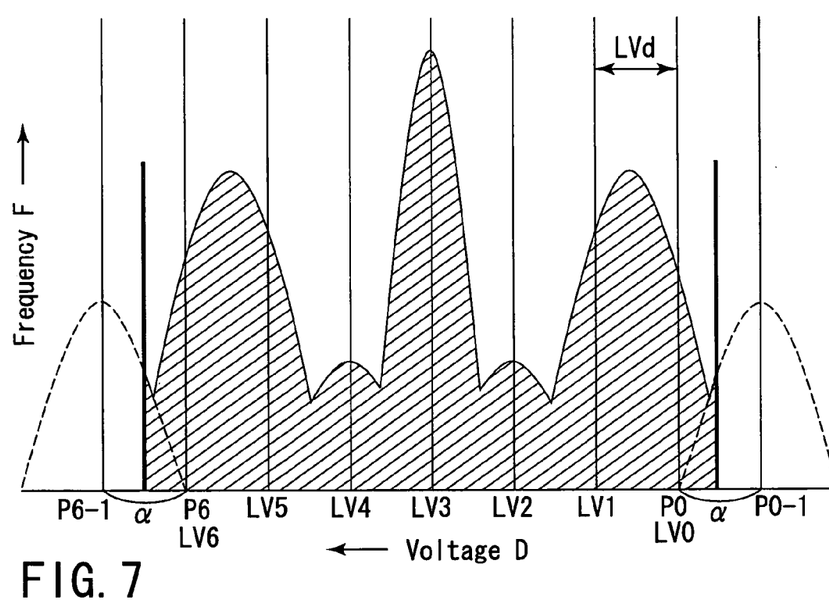
FIG. 7 is an example of a histogram of equalized signals after having been corrected by the variable gain amplifier and the reference levels of the Viterbi decoder of the optical disk apparatus according to the first embodiment.
Figure 8:
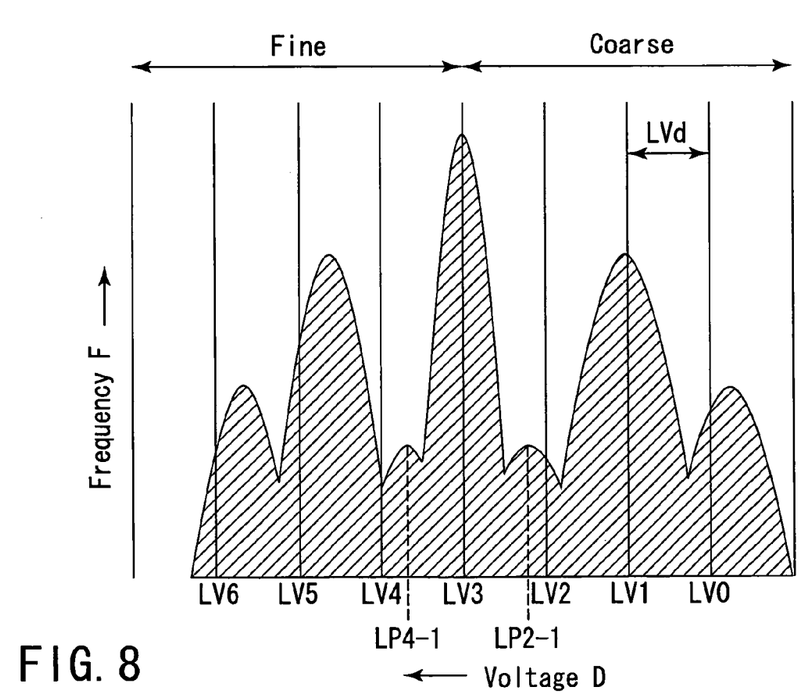
FIG. 8 is an example of a histogram of asymmetrically-distributed equalized signals before being corrected by the variable gain amplifier and reference levels of the Viterbi decoder of the optical disk apparatus according to the first embodiment.
Figure 9:
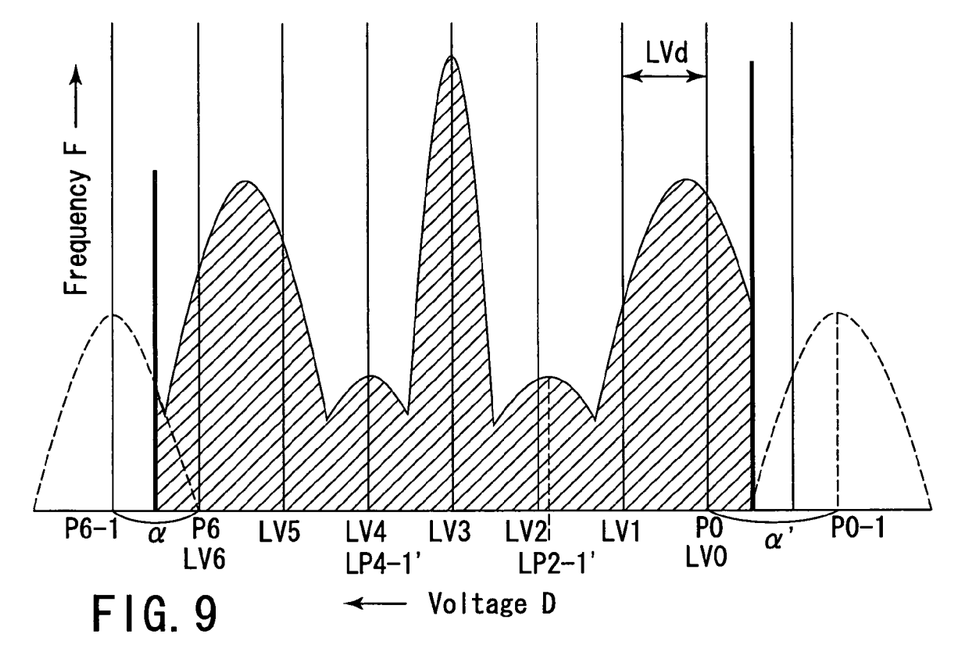
FIG. 9 is an example of a histogram of asymmetrically-distributed equalized signals after having been corrected by the variable gain amplifier and the reference levels of the Viterbi decoder of the optical disk apparatus according to the first embodiment.

Referring to FIGS. 1 and 6 to 9, the first embodiment in the above-described optical disk apparatus according to the invention will be described in detail hereinbelow. FIG. 6 is an example of a histogram of equalized signals before being corrected by the variable gain amplifier to reference levels of the Viterbi decoder of the optical disk apparatus according to the first embodiment. FIG. 7 is an example of a histogram of equalized signals having been corrected by the variable gain amplifier to the reference levels of the Viterbi decoder of the optical disk apparatus according to the first embodiment. FIG. 8 is an example of a histogram of asymmetrically-distributed equalized signals before being corrected by the variable gain amplifier and the reference levels of the Viterbi decoder. FIG. 9 is an example of a histogram of asymmetrically-distributed equalized signals after being corrected by the variable gain amplifier to the reference levels of the Viterbi decoder.

The first embodiment is to provide an information reproducing apparatus and the information reproducing method that reduce bit errors to appropriately correct equalized signals produced from the equalizer so as to correspond to reference levels of Viterbi decoding. To achieve this, correction processing (amplification) is performed so that the amount of expansion between equalized signal histogram peaks corresponding to the reference levels LV0 and LV6 in the histogram reaches the difference LVd between individual reference levels of the Viterbi decoder.

In the configuration shown in FIG. 1, the equalizer, namely, the FIR filter 17 receives the tap coefficient C(n,T) from the parameter control section 15. Thereby, the FIR filter 17 is adaptable-controlled in terms of equalizer characteristics, performs waveform equalization, and outputs the equalized signal Eq(T).

The variable gain amplifier 16 controls the signal amplitude of the equalized signal Eq(T) in accordance with the gain signal G(T) that is output from the parameter control section 15, and in turn outputs the equalized signal Eqg(T). In the variable gain amplifier 16, the equalized signal controlled by a limiter section (not shown) in signal amplitude is saturated at such predetermined levels as LV6+½·LVd and LV0−½·LVd. Specifically, the equalized signal undergoes limiter processing to the level between an upper limit set to LV6+½·LVd and a lower limit set to LV0−½·LVd. Alternatively, the value of the upper limit may be LV6+LVd, LV0−LVd, or may be any other appropriate value.

Suppose that, in the first embodiment, a maximum value of reference levels in the rear-stage Viterbi decoder 18 is represented by LVmax, a minimum value thereof is represented by LVmin, and the difference between individual reference levels of the Viterbi decoder 18 is represented by LVd. In this case, the equalized signal Eqg(T) output from the FIR filter 17 and corrected by the variable gain amplifier 16 is saturated at LVmax+½·LVd and LVmin−½·LVd. Even without the limiter section being used, the reproduction signal can be saturated by controlling, for example, a dynamic range of the reproduction signal in an AD conversion section.

As shown in FIG. 3, the parameter control section 15 has the configuration described above. In the configuration, by using the post-correction equalized signal Eqg(T), the decoded signal D(T), and the reproduction signal Rf(T) output from the preamplifier 12, the parameter control section 15 generates, for example, the tap coefficient C(n,T) of the FIR filter 17 used as the equalizer of the PRML signal processing section and the gain signal G(T) of the variable gain amplifier 16.

More specifically, in the parameter control section 15 in the configuration shown in FIG. 3, operations are performed as described hereunder. The decoded signal D(T) is used to obtain the ideal waveform signal I(T) from the ideal waveform generator 19. Using the gate signal T corresponding to the timing of the ideal waveform signal I(T), the selector 62 classifies the post-correction equalized signals Eqg(T) and selects equalized signals (signal levels) LP(max,T) and LP(min,T) that respectively correspond to the reference levels LVmax and LVmin. Then, the post-correction signals LP(max,T) and LP(min,T) are averaged by the average calculation section 63, individual differences are taken to obtain amplitude information A(T), and the gain signal G(T) to be fed to the variable gain amplifier 16 is generated by the gain calculator 65 in accordance with the amplitude information A(T).

A gain calculation technique in the gain calculator 65 will now be described hereinbelow. In this case, the gain signal G(T) is calculated so that the maximum value LP(max,T) of the post-correction equalized signal LP and the minimum value LP(min,T) of the post-correction equalized signal LP are respectively set as follows:

$$LP(\max,T) = LV\max + Lvd \quad (1)$$

$$LP(\min,T) = LV\min - Lvd \quad (2)$$

An example of the output Eq(T) of the FIR filter 17, which is an equalizer, is shown in FIG. 6 in the form of a histogram. Influenced by noise and the like included in the equalized signal, a plurality of peak levels of the equalized signal, namely, peak levels LP2 and LP4, are not reached to the values corresponding to reference levels LV2 and LV4 even after the equalizer has been adaptable-controlled. As such, in the rear-stage Viterbi decoder 18, the signal is in a state where bit errors can easily occur.

In the form of a histogram, FIG. 7 shows an example of the post-correction equalized signal Eqg(T) obtained after application of a correction corresponding to the gain signal G(T) described above. By the correction, the values of the plurality of peak levels LP2' and LP4' of the post-correction equalized signals have become closer to the reference levels LV2 and LV4 in comparison to the pre-correction states. This relieves the state where bit errors can easily occur in the rear-stage Viterbi decoder 18, consequently enabling high-reliability Viterbi decoding processing to be implemented.

Referring to FIG. 7, when a correction amount a represents a difference between $P_6$ and $P_{6-1}$, and $P_0$ and $P_{0-1}$ are regulated, the correction amount α is a difference LVd between the reference levels of the Viterbi decoder 18 in the first embodiment. However, in an embodiment described below, the amount takes a different value.

When Asymmetry is Occurring in Equalized Signals

The output Eq(T) of the FIR filter 17 does not always take the form of a symmetric distribution. Depending on the case, the output Eq(T) takes the form of an asymmetric distribution, as shown in FIG. 8, in which expressions (1) and (2) shown above cannot be synchronously satisfied. In this case, when expression (3) given below is satisfied, the gain signal is output to satisfy expression (1); and when expression (4) given below is satisfied, the gain signal is output to satisfy expression (2).

$$LP(\max,T) - \tfrac{1}{2}((LP(\max,T) + LP(\min,T)) < LP(\min,T) - \tfrac{1}{2}((LP(\max,T) + LP(\min,T)) \quad (3)$$

$$LP(\max,T) - \tfrac{1}{2}((LP(\max,T) + LP(\min,T)) > LP(\min,T) - \tfrac{1}{2}((LP(\max,T) + LP(\min,T)) \quad (4)$$

In more specific, as shown in FIG. 8, when expression (3) is satisfied, the level distribution of the equalized signals on the side corresponding to LV3 to LV6 is fine, whereas the level distribution of the equalized signals on the side corresponding to LV0 to LV3 is coarse. In this case, as shown in FIG. 9, the gain signal G(T) is determined to satisfy expression (1), which is repeatedly shown below for ready reference:

$$LP(\max,T) = LV\max + Lvd \quad (1)$$

In this case, a correction amount α' on the side of the reference level LV0 takes an arbitrary value.

In contrast, as shown in FIG. 8, when expression (4) is satisfied, the level distribution of the equalized signals on the side corresponding to LV3 to LV6 is coarse, whereas the level distribution of the equalized signals on the side corresponding to LV0 to LV3 is fine. In this case, as shown in FIG. 9, the gain signal G(T) is determined to satisfy expression (2), which is repeatedly shown below for ready reference:

$$LP(\min,T) = LV\min - Lvd \quad (2)$$

In this case, the correction amount on the side of the reference level LV6 takes an arbitrary value.

As described above, when the pre-correction equalized signals Eq(T) are distributed asymmetric, the gain signal G(T) is determined such that the peak levels of the equalized signals Eq(T) on the side where the distribution from the center of the histogram is fine correspond to the post-correction peak levels calculated from the reference levels. Thereby, the rear-stage Viterbi decoding processing can be even more securely implemented.

Second Embodiment

Figure 10:
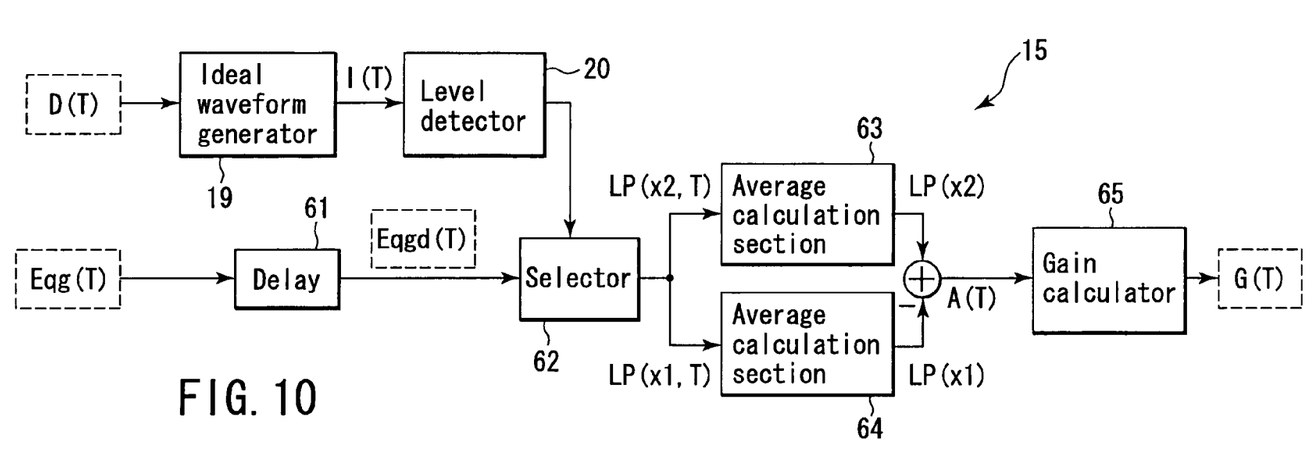
FIG. 10 is a block diagram showing an example of a parameter control section (15) of an optical disk apparatus according to a second embodiment of the invention.
Figure 11:
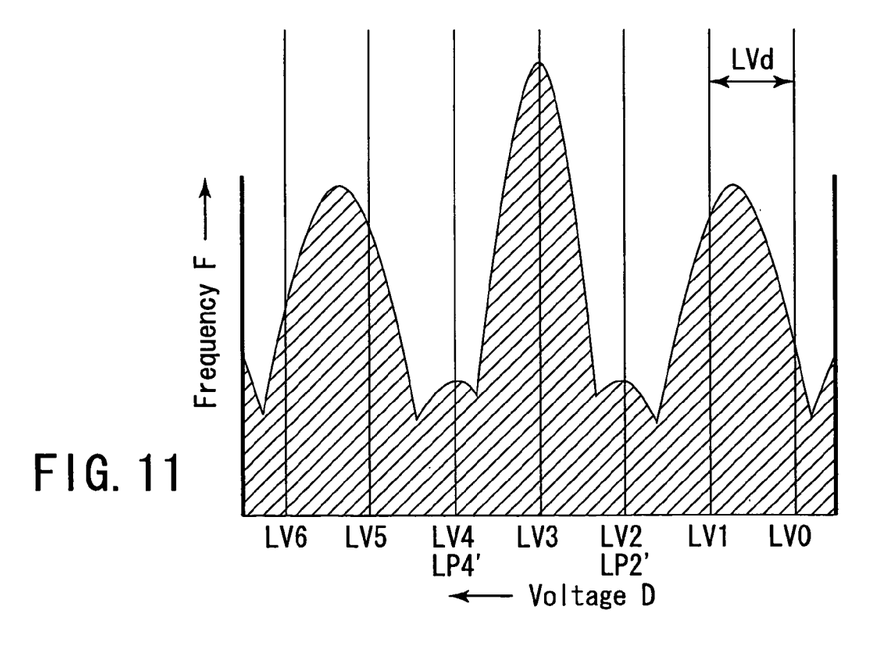
FIG. 11 is an example of a histogram of equalized signals after having been corrected by a variable gain amplifier and reference levels of a Viterbi decoder of the optical disk apparatus according to the second embodiment.

A second embodiment of the invention is to provide an information reproducing apparatus and an information reproducing method that reduce bit errors by applying correction processing such that peak levels (LP2 and LP4) of equalized signals sent from an equalizer for a shortest mark space correspond to potentials of reference levels (LV2 and LV4) in Viterbi decoding for the shortest mark space. FIG. 10 is a block diagram showing an example of a parameter control section 15 of an optical disk apparatus according to a second embodiment of the invention. FIG. 11 is an example of a histogram of equalized signals after having been corrected by a variable gain and reference levels of a Viterbi decoder of the optical disk apparatus.

As shown in FIG. 10, by using a post-correction equalized signal Eqg(T), a decoded signal D(T), and a reproduction signal Rf(T) having been output from the preamplifier 12, the parameter control section 15 generates, for example, a tap coefficient C(n,T) of the FIR filter 17 which is an equalizer of the PRML signal processing section and a gain signal G(T) of the variable gain amplifier 16.

More specifically, in the parameter control section 15 in the configuration shown in FIG. 10, operations are performed as described hereunder. The decoded signal D(T) is used to obtain the ideal waveform signal I(T) from the ideal waveform generator 19. The selector 62 classifies post-correction equalized signals and selects equalized signals (signal levels) LP(x2,T) and LP(x1,T). Then, the post-correction equalized signals (levels) LP(x2,T) and LP(x1,T) are averaged by the average calculation section 63, individual differences are taken to obtain amplitude information A(T), and the gain signal G(T) to be fed to the variable gain amplifier 16 is generated by the gain calculator 65 in accordance with the amplitude information A(T).

A gain calculation technique in the gain calculator 65 will now be described hereinbelow. In a gain adaptation control section provided in the parameter control section 15 according to the second embodiment, reproduction signal levels (LP(x2,T) and LP(x1,T)) corresponding to the amplitude of the shortest mark space are detected by the level detector 20. The signal levels are thus detected instead of the reproduction signals (LP(max,T) and LP(min,T)) corresponding to maximum and minimum values of the reference levels of the Viterbi decoder 18 that are detected in the first embodiment. With the reproduction signal levels (LP(x2,T) and LP(x1, T)), the individual differences are taken to obtain the amplitude information A(T). Then, and the gain signal G(T) to be fed to the variable gain amplifier 16 is generated by the gain calculator 65 in accordance with the amplitude information A(T).

Ideal signal levels in the Viterbi decoder 18 that correspond to the amplitude of the shortest mark space are represented by LV(x1) and LV(x2) (LV(x1)<LV(x2)). In this case, the gain calculator 65 of the parameter control section 15 shown in FIG. 10 calculates the gain signal G(T) to satisfy expressions (5) and (6) given below and outputs the gain signal G(T).

$$LP(x1)=LV(x1) \quad (1)$$

$$LP(x2)=LV(x2) \quad (2)$$

Referring now to FIG. 11, LP(x1) is a post-correction equalized signal LP2', and LP(x2) is a post-correction equalized signal LP4'. Specifically, by correction processing in the gain calculator 65, peak levels LP2 and LP6 shown in FIG. 6 respectively have become the plurality of peak levels LP2' and LP4' of the post-correction equalized signals, therefore having substantially the same values as the reference levels LV2 and LV4, as shown in FIG. 11. This relieves the state where bit errors can easily occur in the rear-stage Viterbi decoder 18, consequently enabling high-reliability Viterbi decoding processing to be implemented.

Similarly to the first embodiment, also in the second embodiment, when the reproduction signals are distributed asymmetric, as shown in FIG. 8, only the values on the fine side in the direction of the signals levels are used to output the gain signal, whereby even more reliable decoding processing can be implemented.

Further, also in the second embodiment, the variable gain amplifier 16 preferably saturates the equalized signal to be output from the FIR filter 17 at LVmax+½·LVd and LVmin−½·LVd.

Third Embodiment

Figure 12:
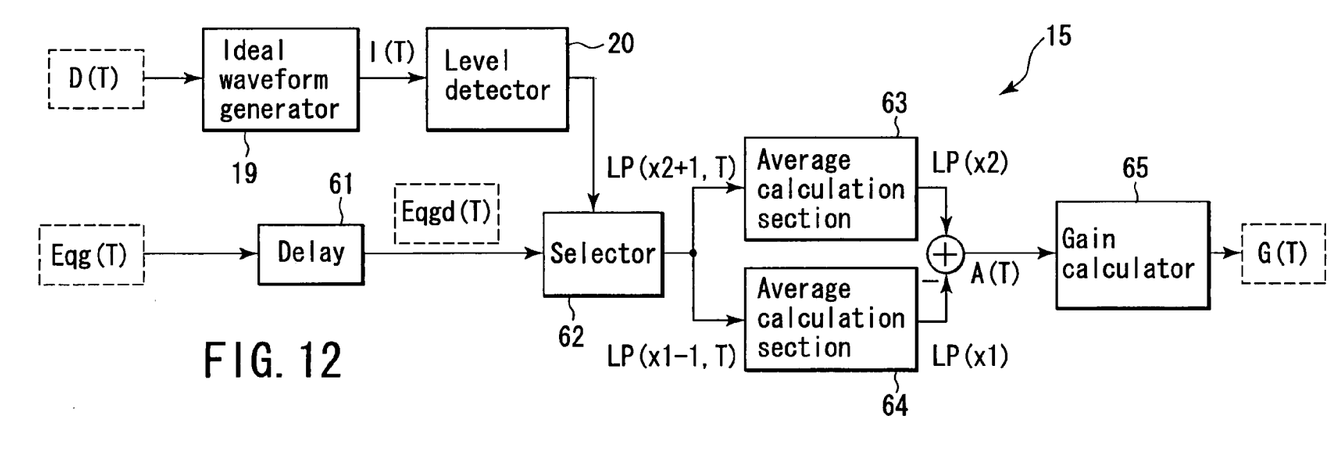
FIG. 12 is a block diagram showing an example of a parameter control section (15) of an optical disk apparatus according to a third embodiment according to the invention.
Figure 13:
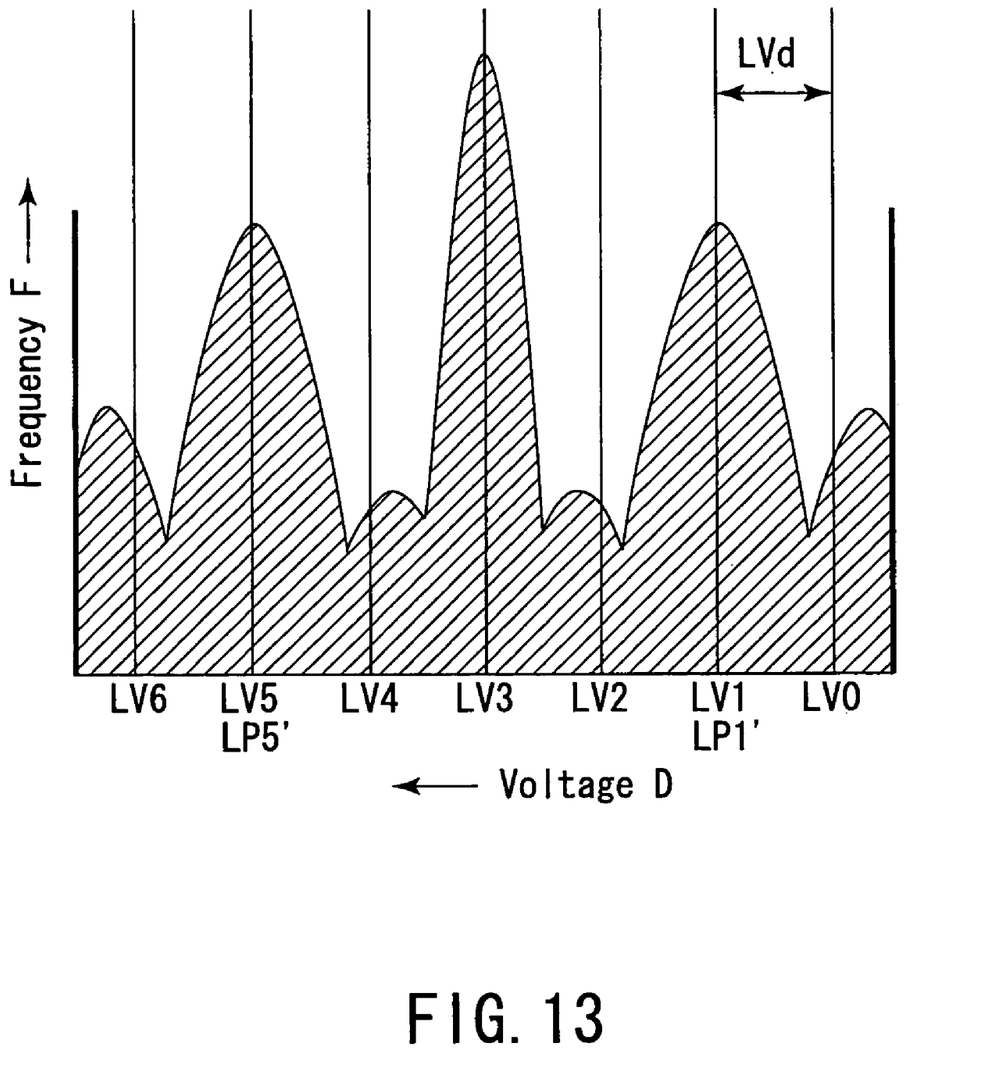
FIG. 13 is an example of a histogram of equalized signals after having been corrected by a variable gain amplifier and a reference level of a Viterbi decoder of the optical disk apparatus according to the third embodiment.

A third embodiment of the invention is to provide an information reproducing apparatus and an information reproducing method that reduce bit errors by applying correction processing such that peak levels (LP2 and LP4) of one-further-outside equalized signals sent from an equalizer for a shortest mark space correspond to potentials of reference levels (LV1 and LV5) in Viterbi decoding for the shortest mark space. FIG. 12 is a block diagram showing an example of a parameter control section 15 of an optical disk apparatus according to a third embodiment of the invention. FIG. 13 is an example of a histogram of equalized signals after having been corrected by a variable gain and reference levels of a Viterbi decoder of the optical disk apparatus.

Dissimilar to the case of the second embodiment, in the third embodiment, correction processing is applied such that peak levels (LP1 and LP5) of the further-outside equalized signals become substantially the same as the values of the reference levels (LV1 and LV5). The selector 62 classifies the post-correction equalized signals and selects equalized signals LP(x2+1,T) and LP(x2−1,T), specifically (LP5) and (LP1) in this particular case. These equalized signals have been obtained corresponding to gate signals output from the level detector 20 of the parameter control section 15 shown in FIG. 12, and have been delayed and corrected by a delay circuit 61. More specifically, in terms of general expressions, reproduction signal levels corresponding to "amplitude+1" reference levels for the shortest mark space is detected, and a gain signal G(T) is calculated to satisfy expressions (7) and (8):

$$LP(x1-1)=LV(x1-1) \quad (1)$$

$$LP(x2+1)=LV(x2+1) \quad (2)$$

Thus, the gain signal G(T) is obtained by the gain calculator 65 of the parameter control section 15 in the same manner as in the second embodiment. However, as shown in FIG. 12, the third embodiment is different from the case of FIG. 10 in that the signals selected by the selector 62 are the equalized signals LP(x2+1,T) and LP(x2−1,T).

In this manner, corresponding to the calculated gain signal G(T), the output Eq(T) is corrected to a post-correction equalized signal Eqg(T). As a result, the peak levels LP1 and LP5 are corrected to peak levels LP1' and LP5' shown in FIG. 13. This relieves the state where bit errors can easily occur in the rear-stage Viterbi decoder 18, consequently enabling high-reliability Viterbi decoding processing to be implemented.

As disclosed in the first and second embodiments, also in the third embodiment, when the reproduction signals are distributed asymmetric, the overall gain signal G(T) is preferably determined such that the peak levels on the fine side as viewed from the center of the histogram the fine side match the reference levels.

According to the various embodiments described above, while those skilled in the art will be able to implement the invention, those will easily be able to envisage various other examples modified to the described embodiments, and will be able to apply them to the various embodiments even without having specific inventive ability. The present invention is therefore adaptable in a broad range as long as contradiction takes place to the disclosed principles and novel features thereof. Accordingly, it is not intended that the invention be limited to those illustrative embodiments.

As one example, for simplicity, the individual embodiments have been described with reference to the case where the gain control is carried out by providing the variable gain amplifier 16 in addition to the equalizer. However, the equalizer can be shared to implement the gain control.

While the individual embodiments have been described with reference to the arrangement of PR (1, 2, 2, 1), the invention is not limited thereby. Equivalent effects and advantages can be obtained for equivalent purposes even in any one of the arrangements, for example, PR (1, 2, 2, 2, 1), PR (1, 1, 1, 1), PR (1, 2, 1), and PR (3, 4, 4, 3).

Although the individual embodiments have been described with reference to the optical disk apparatus by way of example, the invention is not limited thereto. Even for other media as objects, the invention has equivalent effects and advantages that can be implemented for equivalent purposes.

As described above in detail, the invention provides the information reproducing apparatus and information reproducing method that are capable of implementing high-reliable decoding processing in such a manner that the signal amplitudes of equalized signals output from the equalizer employing the partial response equalization scheme is appropriately corrected and bit error rates are improved thereby.

What is claimed is:

1. An information reproducing apparatus for performing maximum-likelihood decoding, comprising:
    a detecting section which detects information recorded in the recording medium and which outputs a reproduction signal;
    an equalizing section which performs partial response equalization of the reproduction signal and which outputs an equalized signal;
    a correcting section which corrects the potential of the equalized signal in accordance with a correction amount determined on the basis of a plurality of reference levels used for the maximum-likelihood decoding, to produce a corrected equalizing signal; and
    a maximum-likelihood decoding section which performs maximum-likelihood decoding of the corrected equalizing signal by referencing the plurality of reference levels, and which outputs a decoded signal;
    wherein, the plurality of reference levels used for the maximum-likelihood decoding are represented by LV(1), LV(2), . . . , LV(n−1), and LV(n) in sequence from the lowest level, and a plurality of levels for peaks in a histogram of equalized signals and that correspond to the reference levels are represented by LP(1), LP(2), . . . , LP(n−1), and LP(n) in sequence from the peak level whose value is smallest, the correction amount is determined by the correcting section to generate a value satisfying one of:

$LP(1)=LV(1)-\alpha$ (where $\alpha$ is a constant), and $LP(n)=LV(n)+\alpha$, and wherein the constant $\alpha$ is the same as a value LVd equal to each of the intervals between the plurality of reference levels used for the maximum-likelihood decoding and, based on the correction amount, the correcting section corrects a corresponding equalized signal level.

2. An information reproducing apparatus according to claim 1, wherein the correction amount is a value determined such that at least one of the corrected values of the plurality of levels for peaks in a histogram of the equalized signals matches at least one of the values of the plurality of reference levels used for the maximum-likelihood decoding.

3. An information reproducing apparatus according to claim 1, wherein the correction amount is a value determined such that at least one of the corrected values of the plurality of levels for peaks in a histogram of the equalized signals that correspond to left and right reference levels adjacent to a central reference level used for the maximum-likelihood decoding matches at least one of the values of the left and right reference levels adjacent to the central reference level.

4. An information reproducing apparatus according to claim 1, wherein when levels for peaks in a histogram of the equalized signals have a distribution asymmetric with respect to a central reference level of the plurality of reference levels used for the maximum-likelihood decoding, such that the distribution has a fine portion and a coarse portion, the correction amount is a value determined such that of left and right reference levels adjacent to the central reference level of the plurality of reference levels used for the maximum-likelihood decoding, a value of the reference level on the side where the distribution includes the fine portion matches a corrected value of a corresponding peak level.

5. An information reproducing apparatus according to claim 1, wherein the correction amount is a value determined such that at least one of reference levels provided at second left and right displacements from a central reference level of the plurality of reference levels used for the maximum-likelihood decoding matches at least one of the corrected values of a plurality of corresponding levels for peaks in a histogram of the equalized signals.

6. An information reproducing apparatus according to claim 1, wherein when levels for peaks in a histogram of the equalized signals have a distribution asymmetric with respect to a peak level corresponding to a central reference level the reference levels, including a fine portion and a coarse portion, the correction amount is a value determined such that, in reference levels provided in second left and right portions of the plurality of reference levels used for the maximum-likelihood decoding, a value of the reference level on the side where the distribution includes the fine portion matches a corrected value of a corresponding peak level.

7. An information reproducing apparatus according to claim 1, wherein the correcting section performs correction by using a variable gain amplifier whose amplification factor can be changed by an external signal.

8. An information reproducing apparatus for performing maximum-likelihood decoding, comprising:
    a detecting section which detects information recorded in the recording medium and which outputs a reproduction signal;
    an equalizing section which performs partial response equalization of the reproduction signal and which outputs an equalized signal;
    a correcting section which corrects the potential of the equalized signal in accordance with a correction amount determined on the basis of a plurality of reference levels used for the maximum-likelihood decoding, to produce a corrected equalizing signal; and
    a maximum-likelihood decoding section which performs maximum-likelihood decoding of the corrected equalizing signal by referencing the plurality of reference levels, and which outputs a decoded signal;
    wherein representing the plurality of reference levels used for the maximum-likelihood decoding by LV(1), LV(2), . . . , LV(n−1), and LV(n) in sequence from the lowest level and representing a plurality of levels for peaks in a histogram of equalized signals and that correspond to the reference levels by LP(1), LP(2), . . . , LP(n−1), and LP(n) in sequence from the peak level whose corrected value is smallest, a value LVd equal to the intervals between the plurality of reference levels used for the maximum-likelihood decoding is used to perform restriction of the equalized signal values to a range between LP(1)–½·LVd and LP(n)+½·LVd.

9. An information reproducing method for performing maximum-likelihood decoding, comprising:
   detecting information recorded in a recording medium and outputting a reproduction signal;
   performing partial response equalization of the reproduction signal and outputting an equalized signal;
   producing a corrected equalized signal by correcting the potential of the equalized signal in accordance with a correction amount determined on the basis of a plurality of reference levels used for the maximum-likelihood decoding; and
   performing the maximum-likelihood decoding of the corrected equalized signal by referencing the plurality of reference levels and outputting a decoded signal,
   wherein, the plurality of reference levels used for the maximum-likelihood decoding are represented by LV(1), LV(2), . . . , LV(n−1), and LV(n) in sequence from the lowest level, and a plurality of levels for peaks in a histogram of equalized signals and that correspond to the reference levels are represented by LP(1), LP(2), . . . , LP(n−1), and LP(n) in sequence from the peak level whose value is smallest, the correction amount is determined by the correcting section to generate a value satisfying one of:

$LP(1)=LV(1)-\alpha$ (where $\alpha$ is a constant), and $LP(n)=LV(n)+\alpha$, and wherein the constant $\alpha$ is the same as a value LVd equal to each of the intervals between the plurality of reference levels used for the maximum-likelihood decoding and, based on the correction amount, the correcting section corrects a corresponding equalized signal level.

10. An information reproducing method according to claim 9, wherein the correction amount is a value determined such that at least one of the corrected values of the plurality of levels for peaks in a histogram of the equalized signals matches at least one of the values of the plurality of reference levels used for the maximum-likelihood decoding.

11. An information reproducing method according to claim 9, wherein the correction amount is a value determined such that at least one of the corrected values of the plurality of levels for peaks in a histogram of the equalized signals that correspond to left and right reference levels adjacent to a central reference level used for the maximum-likelihood decoding matches at least one of the values of the left and right reference levels adjacent to the central reference level.

12. An information reproducing method according to claim 9, wherein, when levels for peaks in a histogram of the equalized signals have a distribution that is asymmetric with respect to a central reference level of the plurality of reference levels used for the maximum-likelihood decoding, such that the distribution has a fine portion and a coarse portion, the correction amount is a value such that, of left and right reference levels adjacent to the central reference level of the plurality of reference levels used for the maximum-likelihood decoding, a value of the reference level on the side where the distribution includes the fine portion matches a corrected value of a corresponding peak level.

13. An information reproducing method according to claim 9, wherein the correction amount is a value determined such that, at least one of reference levels provided at second left and right displacements from a central reference level of the plurality of reference levels used for the maximum-likelihood decoding matches at least one of the corrected values of a plurality of levels for peaks in a histogram.

14. An information reproducing method according to claim 9, wherein, when levels for peaks in a histogram of the equalized signals have a distribution that is asymmetric with respect to a peak level corresponding to a central reference level the reference levels, including a fine portion and a coarse portion, the correction amount is a value determined such that, in reference levels provided in second left and right portions of the plurality of reference levels used for the maximum-likelihood decoding, a value of the reference level on the side where the distribution includes the fine portion matches a corrected value of a corresponding peak level.

15. An information reproducing method according to claim 9, wherein the correction of the equalized signals is performed by using a variable gain amplifier whose amplification factor can be changed by an external signal.

16. An information reproducing method for performing maximum-likelihood decoding, comprising:
   detecting information recorded in a recording medium and outputting a reproduction signal;
   performing partial response equalization of the reproduction signal and outputting an equalized signal;
   producing a corrected equalized signal by correcting the potential of the equalized signal in accordance with a correction amount determined on the basis of a plurality of reference levels used for the maximum-likelihood decoding; and
   performing the maximum-likelihood decoding of the corrected equalized signal by referencing the plurality of reference levels and outputting a decoded signal,
   wherein representing the plurality of reference levels used for the maximum-likelihood decoding by LV(1), LV(2), . . . , LV(n−1), and LV(n) in sequence from the lowest level and representing a plurality of levels for peaks in a histogram of equalized signals and that correspond to the reference levels by LP(1), LP(2), . . . , LP(n−1), and LP(n) in sequence from the peak level whose corrected value is smallest, a value LVd equal to the intervals between the plurality of reference levels used for the maximum-likelihood decoding is used to perform restriction of the equalized signal values to a range between LP(1)–½·LVd and LP(n)+½·LVd.

* * * * *